United States Patent [19]

Inumochi

[11] Patent Number: 5,070,425
[45] Date of Patent: Dec. 3, 1991

[54] SURFACE STRUCTURE OF A MAGNETIC DISK

[75] Inventor: Mitsuo Inumochi, Amagasaki, Japan

[73] Assignee: Mitsubishi Denki Kabushiki Kaisha, Tokyo, Japan

[21] Appl. No.: 660,906

[22] Filed: Feb. 27, 1991

Related U.S. Application Data

[63] Continuation of Ser. No. 339,714, Apr. 18, 1989, abandoned.

[30] Foreign Application Priority Data

Apr. 25, 1988 [JP] Japan ............................... 63-101668

[51] Int. Cl.$^5$ ............................................. G11B 5/82
[52] U.S. Cl. .................................................. 360/135
[58] Field of Search ................. 360/135, 131, 133, 132

[56] References Cited

U.S. PATENT DOCUMENTS

| | | | |
|---|---|---|---|
| 4,326,229 | 4/1982 | Yanagisawa | 360/135 |
| 4,870,524 | 9/1989 | Coe | 360/135 |
| 4,939,614 | 7/1990 | Shirakura et al. | 360/135 |

FOREIGN PATENT DOCUMENTS

| | | | |
|---|---|---|---|
| 2948845 | 7/1980 | Fed. Rep. of Germany | 360/135 |
| 59-178661A | 10/1984 | Japan | 360/135 |
| 61-261820A | 11/1986 | Japan . | |
| 61-278021A | 12/1986 | Japan . | |
| 63-228414A | 9/1988 | Japan | 360/135 |

OTHER PUBLICATIONS

Research Disclosure, Nov. 1988, No. 295, Kenneth Mason Publications, Ltd., England.

Primary Examiner—Robert S. Tupper
Assistant Examiner—Craig A. Renner
Attorney, Agent, or Firm—Wolf, Greenfield & Sacks

[57] ABSTRACT

A magnetic disk, which has a surface with two groups of streaks, the streaks in one group crossing with those in the other group, thus reducing the dynamic friction between a magnetic head and the magnetic disk and also variations in the dynamic friction.

29 Claims, 3 Drawing Sheets

SURFACE STRUCTURE OF A MAGNETIC DISK

This application is a continuation, of application Ser. No. 07/339,714, filed Apr. 18, 1989, now abandoned.

BACKGROUND OF THE INVENTION

1. Field of the Invention

This invention relates to a magnetic disk used for a magnetic disk drive and, more particularly, to the texture configuration of the disk surface.

2. Description of the Prior Art

FIG. 4 shows a top view of a magnetic disk having a plurality of concentric streaks formed by a prior art process disclosed in Japanese Patent Disclosure 61-29,418, and FIG. 5 is an enlarged scale sectional view taken along line V—V in FIG. 4. In these Figures, reference numeral 1 designates a base, numeral 2 concentric streaks, numeral 3 a ground layer, numeral 4 a magnetic film, numeral 5 a protective film, and numeral 6 a lubricant film.

Usually, the magnetic disk of this type is formed as follows. The surface of the base 1 is polished, and the polished surface is plated with a Ni-P alloy to form the ground layer 3, which is then polished. Subsequently, the ground layer 3 is formed with fine irregularities with a grinding tape or the like in order to prevent a head slider from sticking to the disk. These surface irregularities are formed as concentric traces or grooves which appear as streaks on the disk surface.

Afterwards, the magnetic film 4 for recording data therein is formed by means of sputtering on the ground layer 3. Then, a carbon or ceramic film is formed as the protective film 5 by means of sputtering on the magnetic film 4. Finally, the lubricant film 6 is formed on the protective film 5.

Recent magnetic disk drives adopt a commonly termed contact start-stop (CSS) system. In this system, a head slider is in contact with a magnetic disk while the disk is stationary, and when the disk starts to rotate, the head slider starts to float of the disk, sliding on the disk surface until the slider floats fully away from the disk surface.

As shown above, the prior art magnetic disk has concentric surface streaks. Therefore, in areas of the disk surface that are in contact with the head slider, edges of raised portions of the surface texture are formed substantially parallel to the length direction of the air-bearing surface of the head slider. This means that the disk surface area in point or line contact with the air-bearing surface of the head slider varies in the disk surface due to undulation or sinuosity of the edges, thus leading to great difference between the maximum and minimum values of dynamic friction measured over the entire circumference and unsteady torque at the time of the start of disk rotation.

In an ordinary disk drive, a plurality of magnetic disks are mounted at a time. Therefore, if all the disks are stopped at a position corresponding to the maximum value of the dynamic friction, a great torque is required at the time of start of the disk rotation. In addition, it is liable that the head slider fails to float above the disk normally, resulting in a headcrash.

SUMMARY OF THE INVENTION

The present invention has been intended in order to solve the above problems, and its object is to provide a highly reliable magnetic disk, in which variations of the dynamic friction in its surface are reduced, and which has satisfactory CSS characteristic.

According to the invention, there is provided a magnetic disk, which has two groups of surface streaks, the streaks in one group crossing with those in the other group.

The above and other objects, features and advantages of the invention will become more apparent from the following description when taken in conjunction with the accompanying drawings.

Figure 1:
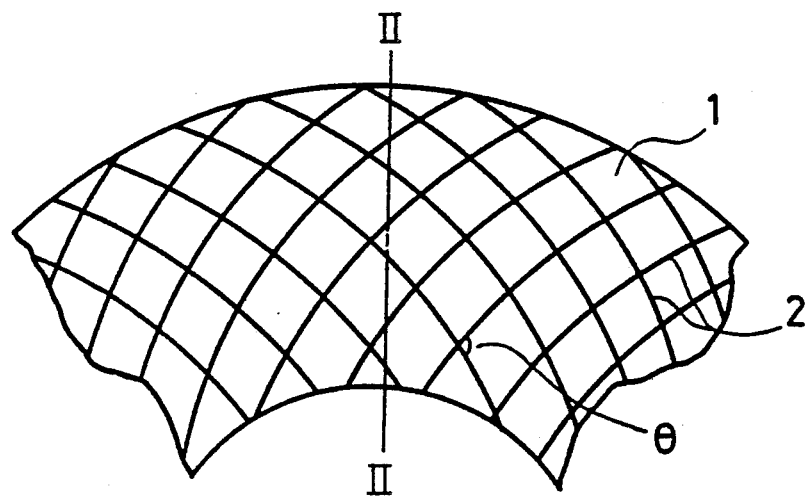
FIG. 1 is a top view showing an embodiment of the magnetic disk according to the invention.

In the Figures, reference numeral 1 designates a base, 2 streaks, 3 a ground layer, and 4 a magnetic film, 5 a protective file, 6 a lubricant film, $\theta$ an angle in which the respective streaks 2 intersect.

In the Figures, like reference numerals designate like or corresponding parts.

DESCRIPTION OF THE PREFERRED EMBODIMENT

Figure 2:
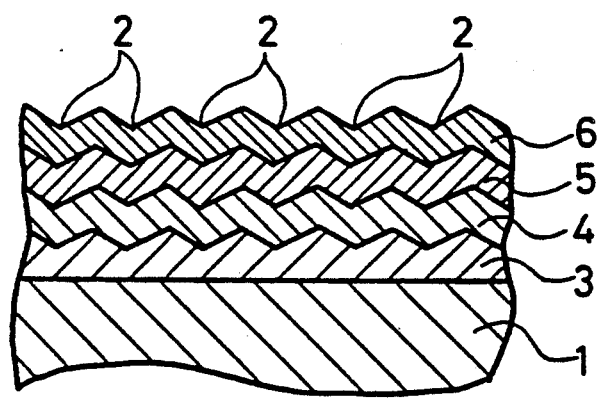
FIG. 2 is a sectional view showing the magnetic disk shown in FIG. 1.

The invention will now be described with reference to the drawings. FIG. 1 shows a top view of an embodiment of the magnetic disk according to the invention, and FIG. 2 is a sectional view of the same magnetic disk. Reference numeral 2 designates streaks formed on the disk surface due to ground traces or grooves formed in ground layer 3. Each of the streaks belongs to one of two groups, with the streaks in one group crossing with those in the other group with intersection angles.

Figure 3:
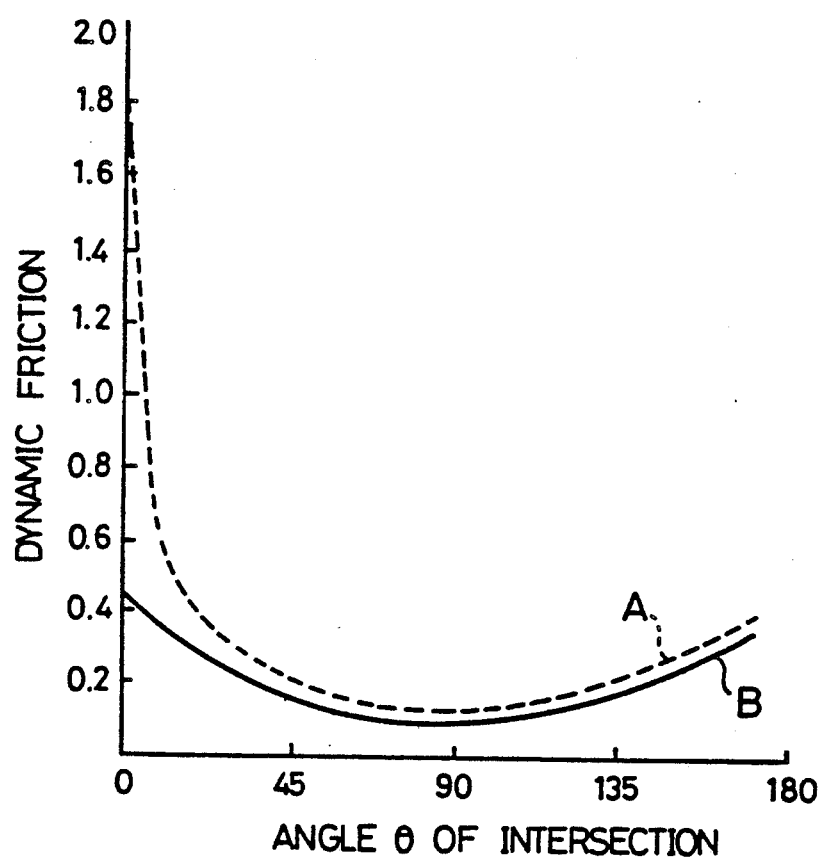
FIG. 3 is a graph showing the relation between dynamic friction and angle of intersection of streaks obtained according to the invention.
Figure 4:
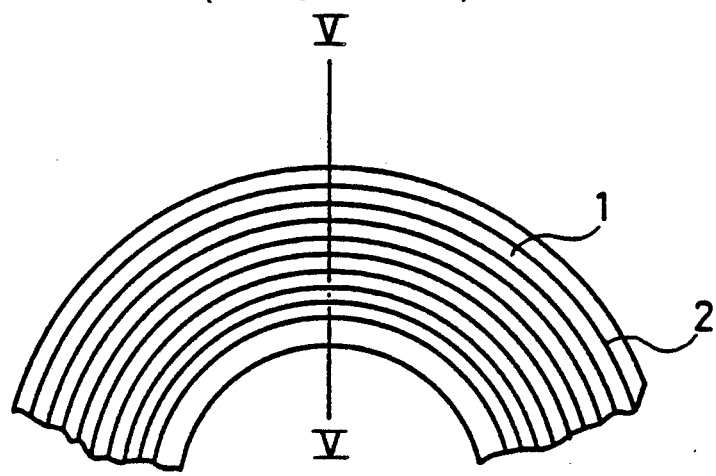
FIG. 4 is a top view showing a prior art magnetic disk.
Figure 5:
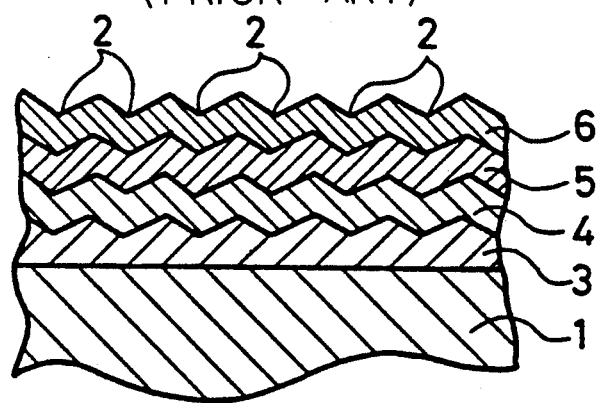
FIG. 5 is a sectional view taken along line V—V in FIG. 4.

With this embodiment, the dynamic friction was measured by varying the angle of intersection of streaks. FIG. 3 shows curves representing the maximum and minimum values of the dynamic friction over the disk circumference plotted against the angle $\theta$ of intersection of streaks, i.e., ground traces or grooves formed by texture processing. In the graph, the ordinate is taken for the dynamic friction, and the abscissa is taken for the intersection angle $\theta$. Curves A and B respectively represent the maximum and minimum values of the dynamic friction plotted against the intersection angle $\theta$. For the measurement, ground traces or grooves were formed in the ground layer with the intersection angle $\theta$ varied at an interval of approximately 10° from 0° (in this case all the streaks are concentric) to 170° (in this case all the streaks are radially spaced apart), and then the magnetic film and protective film were formed. Five magnetic disks were formed in the above way for each case. The maximum and minimum values of the dynamic friction of these disks were measured with an $Al_2O_3$-Tic slider and with a spring load of 10 g and by causing the sliding of a magnetic head slider over the disk circumference at a radius of 80 mm. FIG. 3 shows the average values of the measurements.

It will be seen from FIG. 3 that the difference between the maximum and minimum values of dynamic friction is 1.35 in case where the angle $\theta$ of intersection of streaks is 0° (i.e., where all the streaks are concentric), 0.3, 0.1 and 0.08 where the intersection angle is 10°, 20° and 30°, respectively, and is substantially saturated with approximately 0.05 where the intersection angle exceeds 40°. As is shown, the closer to 0° is the intersection angle, the greater is the difference between the maximum and minimum values of the dynamic friction, that is, the greater are the fluctuations of the dynamic friction in the same disk surface. In other words, the closer to 0° is the intersection angle, the start torque at the time of contact start is the more unsteady, thus having adverse effects on the CSS characteristic.

Actually, the difference between the maximum and minimum dynamic friction values and the dynamic friction itself can be reduced by forming disk surface streaks in a crossing fashion compared to the prior art concentric arrangement of streaks. The intersection angle $\theta$ of streaks suitably ranges from 10° to 160°, more preferably from 30° to 150°, and most preferably from 60° to 120°. It is the most suitable to form the streaks to be crossed each other almost at a right angle.

With magnetic disk surface streaks formed such that they cross one another as in the above embodiment, it is possible to reduce variations of the dynamic friction and dynamic friction itself compared to those in the prior art and obtain satisfactory CSS characteristic and improved reliability. In addition, the adhesion of the magnetic film to the ground layer can be increased compared to the case where concentric ground traces or grooves are formed in the ground layer.

While in the above embodiment the ground traces or grooves were formed on the ground layer, the same effects can be obtained by forming the ground traces or grooves on the protective film.

The effects of the invention can be obtained irrespective of whether the protective film and lubricant film are present or not.

As has been shown in the foregoing, according to the invention the disk surface has two groups of streaks, the streaks in one group crossing with those in the other group, so that it is possible to reduce variations of the dynamic friction in the same disk surface as well as the dynamic friction itself and obtain a magnetic disk having satisfactory CSS characteristic and high reliability.

What is claimed is:

1. A magnetic disk having a surface with two groups of arcuate streaks, the streaks in one of said two groups crossing with multiple streaks in the other group wherein an angle $\theta$ of intersection of the streaks is in a range of 10° to 160°.

2. The magnetic disk as set forth in claim 1 wherein said streaks are provided over a substantial portion of said magnetic disk including areas thereof outside a landing zone of said magnetic disk.

3. A magnetic disk having a surface with two groups of arcuate streaks, the streaks in one of said two groups crossing with multiple streaks in the other group wherein an angle $\theta$ of intersection of the streaks is in a range of 30° to 150°.

4. A magnetic disk having a surface with two groups of arcuate streaks, the streaks in one of said two groups crossing with multiple steaks in the other group wherein an angle $\theta$ of intersection of the streaks is in a range of 60° to 120°.

5. A magnetic disk having a surface with two groups of arcuate streaks, the streaks in one of said two groups crossing with multiple steaks in the other group wherein an angle $\theta$ of intersection of the streaks is 90°.

6. A magnetic disk having a surface with two groups of streaks, the streaks in one of said two groups crossing with those in the other group neither group being concentric about a center of the disk, wherein an angle $\theta$ of intersection of the streaks is in a range of 10° to 160°.

7. The magnetic disk as set forth in claim 6 wherein each streak of said two groups terminates at points proximate each of inside and outside edges of the disk.

8. The magnetic disk as set forth in claim 6 wherein said streaks are provided over a substantial portion of said magnetic disk including areas thereof outside a landing zone of said magnetic disk.

9. A magnetic disk having a surface with two groups of streaks, the streaks in one of said two groups crossing with those in the other group, neither group being concentric about a center of the disk, wherein an angle $\theta$ of intersection of the streaks is in a range of 30° to 150°.

10. The magnetic disk as set forth in claim 9 wherein each streak of said two groups terminates at points proximate each of inside and outside edges of the disk.

11. The magnetic disk as set forth in claim 9 wherein said streaks are provided over a substantial portion of said magnetic disk including areas thereof outside a landing zone of said magnetic disk.

12. A magnetic disk having a surface with two groups of streaks, the streaks in one of said two groups crossing with those in the other group, neither group being concentric about a center of the disk, wherein an angle $\theta$ of intersection of the streaks is in a range of 60° to 120°.

13. The magnetic disk as set forth in claim 12 wherein each streak of said two groups terminates at points proximate each of inside and outside edges of the disk.

14. The magnetic disk as set forth in claim 12 wherein said streaks are provided over a substantial portion of said magnetic disk including areas thereof outside a landing zone of said magnetic disk.

15. A magnetic disk having a surface with two groups of streaks, the streaks in one of said two groups crossing with those in the other group, neither group being concentric about a center of the disk, wherein an angle $\theta$ of intersection of the streaks is 90°.

16. The magnetic disk as set forth in claim 15 wherein each streak of said two groups terminates at points proximate each of inside and outside edges of the disk.

17. The magnetic disk as set forth in claim 15 wherein each streaks are provided over a substantial portion of said magnetic disk including areas thereof outside a landing zone of said magnetic disk.

18. A magnetic disk having a surface with two groups of arcuate streaks, the streaks in one of said two groups crossing with those in the other group, wherein an angle $\theta$ of intersection of the streaks is in a range of 10° to 160°.

19. The magnetic disk as set forth in claim 18 comprising the steaks in one of said two groups crossing multiple streaks in the other group.

20. The magnetic disk as set forth in claim 18 wherein said streaks are provided over a substantial portion of said magnetic disk including areas thereof outside of a landing zone of said magnetic disk.

21. A magnetic disk having a surface with two groups of arcuate streaks, the streaks in one of said two groups crossing with those in the other group, wherein an angle $\theta$ of intersection of the steaks is in a range of 30° to 150°.

22. The magnetic disk as set forth in claim 21 comprising the streaks in one of said two groups crossing multiple streaks in the other group.

23. The magnetic disk as set forth in claim 21 wherein said streaks are provided over a substantial portion of said magnetic disk including areas thereof outside of a landing zone of said magnetic disk.

24. A magnetic disk having a surface with two groups of arcuate streaks, the streaks in one of said two groups crossing with those in the other group, wherein an angle $\theta$ of intersection of the streaks is in a range of 60° to 120°.

25. The magnetic disk as et forth in claim 24 comprising the streaks in one of said two groups crossing multiple streaks in the other group.

26. The magnetic disk as set forth in claim 24 wherein said streaks are provided over a substantial portion of said magnetic disk including areas thereof outside of a landing zone of said magnetic disk.

27. A magnetic disk having a surface with two groups of arcuate streaks, the streaks in one of said two groups crossing with those in the other group, wherein an angle $\theta$ of intersection of the steaks is 90°.

28. The magnetic disk as set forth in claim 27 comprising the streaks in one of said two groups crossing multiple streaks in the other group.

29. The magnetic disk as set forth in claim 27 wherein said streaks are provided over a substantial portion of said magnetic disk including areas thereof outside of a landing zone of said magnetic disk.

* * * * *